March 2, 1926.  
R. H. CONTY  
SANDING DEVICE  
Filed March 14, 1925
1,575,098
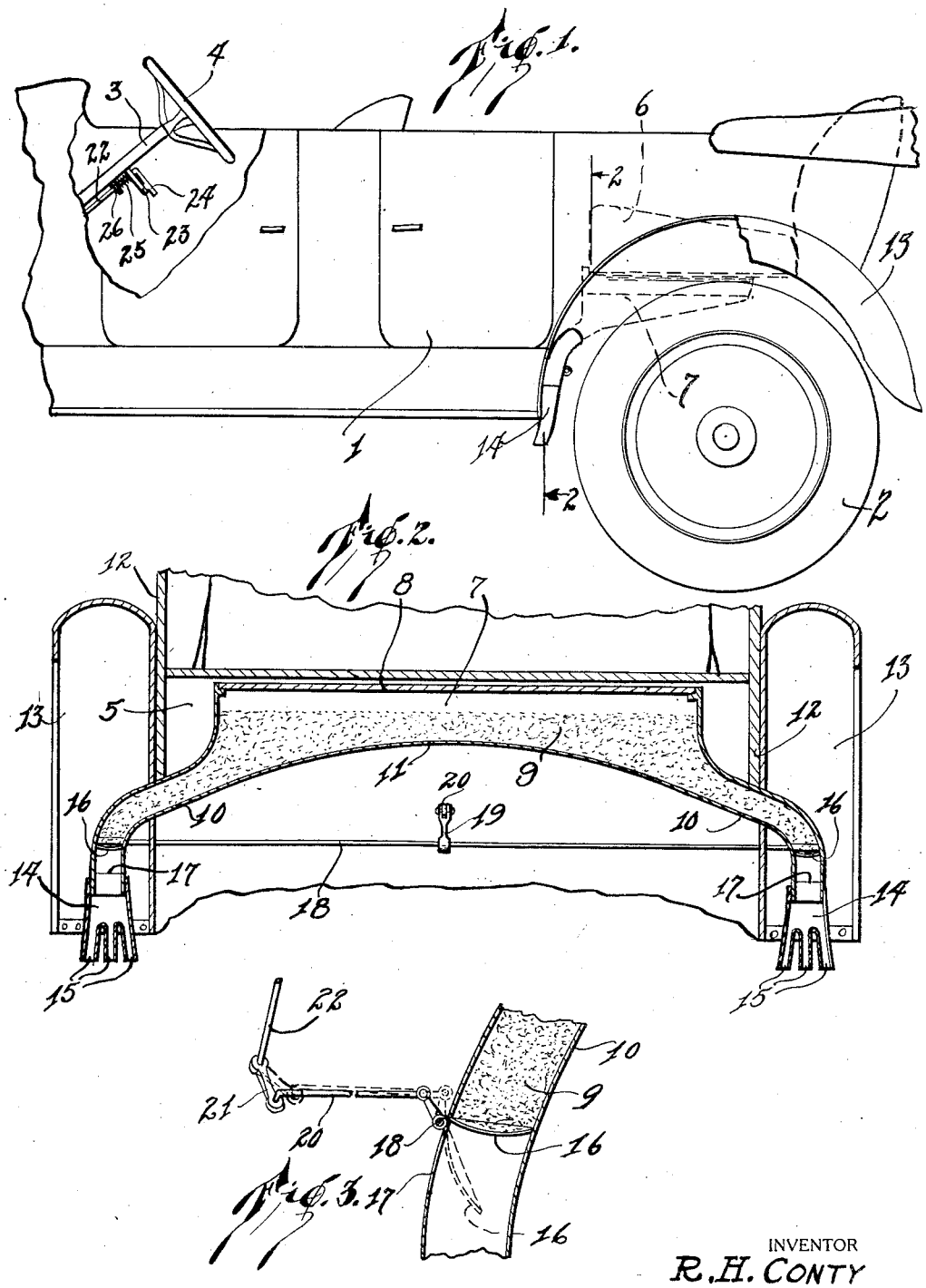
INVENTOR
R. H. CONTY
BY Munn & Co.
ATTORNEYS Patented Mar. 2, 1926.

1,575,098

UNITED STATES PATENT OFFICE.

RENE HENRY CONTY, OF CHICAGO, ILLINOIS.

SANDING DEVICE.

Application filed March 14, 1925. Serial No. 15,670.

*To all whom it may concern:*

Be it known that I, RENE HENRY CONTY, a citizen of the United States, and a resident of Chicago, in the county of Cook and State of Illinois, have invented a new and useful Improvement in Sanding Devices, of which the following is a full, clear, and exact description.

My invention relates to improvements in sanding devices, particularly that type of sanding device for use on moving vehicles, and it consists in the combinations, constructions, and arrangements herein described and claimed.

An object of my invention is to provide a sanding device of the character described for use on motor vehicles, particularly those employing rubber tires such as gasoline automobiles and the like.

A further object of my invention is to provide a device of the character described by means of which the quantity of sand distributed in front and sides of the moving wheels of the vehicle can be carefully regulated from the driver's seat.

A further object of my invention is to provide a device of the character described in which novel means is employed for delivering equal quantities of sand to each of the distributing spouts.

A further object of my invention is to provide a device of the character described in which sand is distributed, each of the wheels having a distributer associated therewith, simultaneously and in like quantities.

Other objects and advantages will appear in the following specification, and the novel features of the invention will be particularly pointed out in the appended claims.

My invention is illustrated in the accompanying drawings, forming a part of this application, in which—

Figure 1 is a partial side elevation of a motor vehicle equipped with my improved sanding device.

Figure 2 is a sectional view along the line 2—2 of Figure 1, and

Figure 3 is an enlarged sectional view of a means for controlling the flow of sand to the distributers.

In carrying out my invention I make use of a motor vehicle 1 having rear driving wheels 2 with which a brake mechanism, not shown, is associated. My improved sanding device is intended for use with its distributing members associated with the wheels of the vehicle having brake appliances for stopping the wheels.

The vehicle 1 is provided with a steering column 3 of ordinary construction, having a steering wheel 4 at the upper end thereof and a storage space 5 at the rear of the seat 6 in which the sand hopper employed in my present invention is disposed. This hopper is shown at 7 and extends substantially the width of the space 5. The hopper is provided with a cover 8 which may be removed for the purpose of filling the hopper with sand 9.

There is a delivery duct 10 at each end of the hopper 7 at the bottom thereof through which sand 9 is delivered for the purpose of distribution.

With reference to Figure 2, it will be noted that the bottom wall 11 of the hopper 7 bulges upwardly at the center so as to guide equal quantities of sand 9 through the delivery ducts 10. These delivery ducts 10 are projected through the side walls 12 of the body of the vehicle 1 and through the sides of the fenders or mud guards 13 of the vehicle. The ducts 10 (see Figure 1) extend close to and engage with the inner walls of the fenders 13 so as to lie clear of the walls 2 when the vehicle is driven, and during which time the body 1 moves considerable with relation to the wheels by virtue of its springs.

A distributer member 14 is carried and connected with the lowermost ends of the ducts 10 (see Figure 2). This distributer 14 terminates at its lower end in three diverging tubular portions 15 through which sand may be projected over a space sufficiently wide upon the road so as to include the entire area over which the tread of the wheel 2 passes and on each side thereof.

Means for simultaneously admitting sand delivered through the ducts 10 to the distributer members 14 in predetermined quantities is provided in a normally closed valve plate 16. This plate is hingedly mounted to the duct 10 and projects through an opening 17 in the side wall of the duct adjacent to the fender 13. A rod 18 extends between the valve plates 17 across the body of the vehicle and serves as a center by means of which the plates are hingedly mounted to the ducts 10.

At the mid point of the rod 18 is an arm 19 which extends radially therefrom. This arm is connected by means of a connecting rod 20 to the outer end of an arm 21 extending radially from a shaft 22 which is rotatably mounted parallel with the steering column 3 of the vehicle. The upper end of the shaft 22 is projected through a quadrant 23 and terminates in a lever portion 24 which bears against the quadrant 23. As the lever 24 is moved, the arm 21 will likewise move and draw the connecting rod 20 in such a manner as to open or close the valve plates 17 and thus permit sand 9 to flow to the distributer members 14 simultaneously.

A compression spring 25 is disposed concentric with the shaft 22 and bears at one end on the under side of the quadrant 23 and at the other end against a pin 26 projected through the shaft 22. Thus the lever 24 is held in frictional engagement with the quadrant.

When the valve plate 16 is entirely open, it will close the opening 17 so that no sand may pass therethrough. However, since this opening is flush with the fender 13 there is little likelihood of sand escaping at this point.

From the foregoing description of the various parts of the device, the operation thereof may be readily understood. Let us assume that the vehicle 1 is moving over a road and that the road is particularly slippery. The driver in order to assure proper gripping of the wheels 2 upon the pavement when applying the brakes will manually actuate the lever 24 on the quadrant 23. This will permit a quantity of sand to flow down through the ducts 10 and through the distributers 14. The quantity delivered depends entirely upon the extent of movement of the lever 24. The sand will continue to flow until the lever has resumed its inoperative position.

The sand 9 will be delivered in front and on each side of the wheels 2 and as the wheel passes thereover will serve as a medium for preventing the skidding of the wheel upon the pavement.

In like manner when it is difficult to start the vehicle from a standstill because of icy or slippery pavements, the driver will deposit sand upon the pavement by actuation of the lever 24 so that a good gripping surface may be provided for the vehicle.

It will be noted that because of the arch or bulged construction 11 of the hopper 7 that equal quantities of sand are provided for each of the ducts 10, and that when the lever 24 is actuated, the valve plate 16 will operate simultaneously and equal quantities of sand will flow through the distributers 14 to the pavement in front of the wheels, and to each side. In turning corners also, the spread of the sand will prevent the vehicle from skidding.

I claim:

1. The combination with a motor vehicle, of a sanding device comprising a hopper carried by the vehicle, a delivery duct communicating with said hopper at one end and having its opposite end in registration with one of the wheels of said vehicle, a distributer member disposed at the lower end of the duct, said duct having a portion of its wall cut away, a valve member hingedly mounted upon said duct adjacent to said cutaway portion of the duct, and manually actuated means for moving the valve on its hinged support so as to lie transversely across the duct thereby closing the duct and whereby the valve may be moved into registration with the cutaway portion of the duct so as to entirely close that portion and lie contiguous therewith.

2. The combination with a motor vehicle, of a sanding device comprising a hopper carried by the vehicle, delivery ducts communicating with said hopper at one end and having their opposite ends in registration with certain of the wheels of said vehicle, distributer members disposed at the lower ends of the ducts, said ducts having a portion of the side walls cut away, a valve member for each of the ducts hingedly mounted thereon at a point adjacent to the cutaway portion, and manually actuated means for operating the valve members whereby the valve members may be moved to a position transversely across the ducts so as to shut off the duct and whereby the valve may be moved into registration with the cutaway portion of the duct and with its surface contiguous therewith.

RENE HENRY CONTY.